(12) United States Patent
Lu et al.

(10) Patent No.: US 12,132,990 B2
(45) Date of Patent: Oct. 29, 2024

(54) IMAGE STABILIZATION MOTOR, CAMERA MODULE, AND ELECTRONIC DEVICE

(71) Applicant: HUAWEI TECHNOLOGIES CO., LTD., Guangdong (CN)

(72) Inventors: Lei Lu, Dongguan (CN); Li-Te Kuo, Dongguan (CN); Jiapeng Dan, Dongguan (CN); Xin Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 17/941,173

(22) Filed: Sep. 9, 2022

(65) Prior Publication Data

US 2023/0007180 A1    Jan. 5, 2023

Related U.S. Application Data

(63) Continuation of application No. PCT/CN2021/074785, filed on Feb. 2, 2021.

(30) Foreign Application Priority Data

Mar. 10, 2020    (CN) .......................... 202010163096.9

(51) Int. Cl.
  *H04N 23/68* (2023.01)
  *H04N 23/55* (2023.01)
  *H04N 23/57* (2023.01)

(52) U.S. Cl.
  CPC ........... *H04N 23/687* (2023.01); *H04N 23/55* (2023.01); *H04N 23/57* (2023.01)

(58) Field of Classification Search
  None
  See application file for complete search history.

(56) References Cited

U.S. PATENT DOCUMENTS

| | | |
|---|---|---|
| 2012/0182436 A1 | 7/2012 | Hu et al. |
| 2013/0340548 A1 | 12/2013 | Lin et al. |
| (Continued) | | |

FOREIGN PATENT DOCUMENTS

| | | |
|---|---|---|
| CN | 203465497 U | 3/2014 |
| CN | 104635401 A | 5/2015 |
| (Continued) | | |

OTHER PUBLICATIONS

International Search Report issued in PCT/CN2021/074785, dated Apr. 21, 2021, 10 pages.

(Continued)

*Primary Examiner* — Paul M Berardesca

(57) ABSTRACT

An image stabilization motor, a camera module, and an electronic device are disclosed. The image stabilization motor includes a lens carrier, a sensing component, a base, a bearing assembly, and a driving component. The lens carrier is configured to fasten a lens, the sensing component is fastened to the lens carrier, the bearing assembly is mounted on the base, the driving component is fastened to the base, and the driving component cooperates with the sensing component, so that the lens carrier can rotate around the bearing assembly. In the image stabilization motor, the camera module, and the electronic device, by disposing the bearing assembly, the lens carrier needs to overcome only friction force between the lens carrier and the bearing assembly in an entire rotation process.

17 Claims, 7 Drawing Sheets

(56) References Cited

U.S. PATENT DOCUMENTS

| | | | |
|---|---|---|---|
| 2015/0296112 A1 | 10/2015 | Park et al. | |
| 2018/0284566 A1 | 10/2018 | Minamisawa | |
| 2019/0230262 A1* | 7/2019 | Wang | G02B 7/08 |
| 2020/0333622 A1* | 10/2020 | Fujisaki | G03B 17/17 |
| 2020/0363626 A1* | 11/2020 | Seo | G03B 30/00 |
| 2021/0181460 A1* | 6/2021 | Lee | G02B 7/1805 |
| 2021/0215945 A1* | 7/2021 | Rho | G06F 1/1626 |
| 2021/0286193 A1* | 9/2021 | Kwon | G02B 13/02 |
| 2021/0333521 A9* | 10/2021 | Yedid | H04N 23/698 |
| 2022/0070341 A1* | 3/2022 | Seo | H04N 23/51 |
| 2022/0150389 A1* | 5/2022 | Smirnov | G03B 3/10 |
| 2024/0080560 A1* | 3/2024 | Jang | H04N 23/55 |

FOREIGN PATENT DOCUMENTS

| | | |
|---|---|---|
| CN | 104698722 A | 6/2015 |
| CN | 109413316 A | 3/2019 |
| CN | 209497532 U | 10/2019 |
| EP | 3342149 A1 | 7/2018 |
| JP | 2007041455 A | 2/2007 |
| JP | 2015082072 A | 4/2015 |
| JP | 2018077390 A | 5/2018 |
| JP | 2018077392 A | 5/2018 |
| JP | 2018200376 A | 12/2018 |
| JP | 2019015846 A | 1/2019 |
| JP | 2019020502 A | 2/2019 |
| KR | 20180135392 A | 12/2018 |

OTHER PUBLICATIONS

Examination Report issued in IN202237052742, dated Mar. 30, 2023, 5 pages.

Office Action issued in CN202010163096.9, dated Jun. 6, 2022, 9 pages.

Office Action issued in JP2022-554707, dated Apr. 1, 2024 with English translation, 6 pages.

Extended European Search Report issued in EP21767490.2, dated Jul. 7, 2023, 9 pages.

Office Action issued in Korean Patent Appln. No. 2022-7034159, dated Jun. 7, 2024, with English Translation, 12 pages.

* cited by examiner

IMAGE STABILIZATION MOTOR, CAMERA MODULE, AND ELECTRONIC DEVICE

CROSS-REFERENCE TO RELATED APPLICATIONS

This application is a continuation of International Application No. PCT/CN2021/074785, filed on Feb. 2, 2021, which claims priority to Chinese Patent Application No. 202010163096.9, filed on Mar. 10, 2020. The disclosures of the aforementioned applications are hereby incorporated by reference in their entireties.

TECHNICAL FIELD

This application relates to the field of imaging technologies, and in particular, to an image stabilization motor, a camera module, and an electronic device.

BACKGROUND

As a user has an increasingly high requirement for image quality, video recording and photographing technologies are continuously developed, to obtain a clearer image with higher quality. In a video recording or photographing process, because the user's hand shakes or another external factor causes an electronic device to shake in the photographing process, a photographed image is unclear, and image quality is affected. To resolve this technical problem, an electronic device with an image stabilization function emerges.

In the conventional technology, an electronic device includes a camera module. The camera module includes an image stabilization motor and a lens. The lens is mounted on the image stabilization motor by using a spring plate. In the conventional technology, a value of an image stabilization angle of the lens depends on rigidity of the spring plate. When the rigidity of the spring plate is small, large-angle image stabilization may be performed, but a posture difference of the image stabilization motor is large. When the rigidity of the spring plate is large, the posture difference of the image stabilization motor is small. However, when large-angle image stabilization is performed in this case, large motor thrust force is required. The posture difference of the image stabilization motor refers to differences in a movement track and a direction of the image stabilization motor obtained when a center of gravity location of the image stabilization motor changes in different photographing postures of the electronic device.

Therefore, the camera module in the conventional technology cannot meet shake suppression in many scenarios.

SUMMARY

This application provides an image stabilization motor, a camera module, and an electronic device, to implement rotation of a lens in a large angle range, so that the camera module is applicable to more application scenarios.

A first aspect of this application provides an image stabilization motor, including:
a lens carrier, configured to mount a lens;
a sensing component, fastened on the lens carrier;
a base;
a bearing assembly mounted on the base; and
a driving component, fastened on the base, where the driving component cooperates with the sensing component, so that the lens carrier can rotate around the bearing assembly.

In the image stabilization motor provided in this application, the bearing assembly is disposed, so that the lens carrier needs to overcome only friction force between the lens carrier and the bearing assembly in an entire rotation process. In this way, the lens carrier can drive the lens to rotate in a large angle range, and a camera module can adapt to more scenarios.

In a possible implementation, the sensing component includes a pair of first sensing pieces arranged in a second direction:
the driving component includes a pair of first driving pieces arranged in the second direction;
the bearing assembly includes a first bearing assembly; and
the first driving pieces cooperate with the first sensing pieces, so that the lens carrier rotates around the first bearing assembly, thereby driving the lens carrier to rotate in a plane in which a first direction and the second direction are located.

The first driving pieces cooperate with the first sensing pieces, so that the lens carrier rotates around the first bearing assembly, thereby driving the lens carrier to rotate in the plane in which the first direction and the second direction are located.

In a possible implementation, the lens carrier includes a pair of first side panels arranged in the second direction and disposed opposite to each other; and the pair of first sensing pieces are separately fastened on the first side panel.

The first side panel is disposed to support and fasten the first sensing pieces, thereby improving reliability of the first sensing pieces.

In a possible implementation, the base includes a bottom plate and a pair of second side panels arranged in the second direction and disposed opposite to each other, where the second side panels are connected to the bottom plate:
the pair of first driving pieces are respectively fastened on the pair of second side panels; and
the first bearing assembly is mounted on the bottom plate.

The second side panel is disposed to support and fasten the first driving piece, thereby improving reliability of the first driving piece.

In a possible implementation, the first bearing assembly includes a bearing and a rotating shaft:
the bearing is mounted on the bottom plate;
the rotating shaft is mounted in an inner hole of the bearing; and
the first driving pieces cooperate with the first sensing pieces, so that the lens carrier rotates around the rotating shaft, thereby driving the lens carrier to rotate in the plane in which the first direction and the second direction are located.

The first driving pieces cooperate with the first sensing pieces, so that the lens carrier rotates around the rotating shaft, thereby driving the lens carrier to rotate in the plane in which the first direction and the second direction are located.

In a possible implementation, the sensing component includes a second sensing piece:
the driving component includes a second driving piece;
the bearing assembly includes a pair of second bearing assemblies; and
the second driving piece cooperates with the second sensing piece, so that the lens carrier rotates around the second bearing assemblies, thereby driving the lens carrier to rotate in a plane in which the first direction and a third direction are located.

The second driving piece cooperates with the second sensing piece, so that the lens carrier rotates around the second bearing assemblies, thereby driving the lens carrier to rotate in the plane in which the first direction and the third direction are located.

In a possible implementation, the lens carrier includes a third side panel, and the second sensing piece is fastened on the third side panel:
  the base includes the bottom plate and a fourth side panel, and the fourth side panel is connected to the bottom plate and corresponds to the third side panel; and
  the second driving piece is fastened on the fourth side panel.

The third side panel is disposed to support and fasten the second sensing piece, thereby improving reliability of the second sensing piece. The fourth side panel is disposed to support and fasten the second driving piece, thereby improving reliability of the second driving piece.

In a possible implementation, the bearing assembly includes the first bearing assembly and the second bearing assemblies, and the first bearing assembly is mounted on the base:
  the image stabilization motor further includes a connection plate, and the first bearing assembly is mounted on the connection plate;
  the second bearing assemblies are mounted on the connection plate; and
  the lens carrier cooperates with the second bearing assemblies.

The connection plate is disposed, so that linkage rotation cooperation between the lens carrier and the first bearing assembly and between the lens carrier and the second bearing assemblies can be implemented.

In a possible implementation, the connection plate includes a first body portion and a first bent portion:
  the first bent portion is connected to two ends of the first body portion;
  the first bearing assembly is mounted on the first body portion; and
  the second bearing assemblies are mounted on the first bent portion.

In a possible implementation, the second bearing assembly includes a mounting base and a ball, and the ball is mounted on the mounting base:
  the first bent portion is provided with a mounting hole;
  the mounting base is mounted in the mounting hole; and
  the ball cooperates with the lens carrier.

In the foregoing solution, the ball cooperates with the lens carrier, so that the lens carrier can implement fine adjustment in all directions.

In a possible implementation, the lens carrier is provided with a dent; and
  the ball cooperates with the dent.

The ball is disposed to cooperate with the dent, so that rotation cooperation between the lens carrier and the second bearing assemblies can be implemented.

In a possible implementation, the base includes the bottom plate; and
  the first body portion is connected to the bottom plate.

The bottom plate is disposed to provide support and installation space for the connection plate.

In a possible implementation, the image stabilization motor further includes a stopper; and
  the stopper is connected to the bottom plate, and is configured to limit displacement of the connection plate in the third direction.

The displacement of the connection plate in the third direction can be limited by disposing the stopper. When the base is upside down, the connection plate bears a load, and therefore may be detached from the rotating shaft. In this case, the stopper can abut against the connection plate, to prevent the connection plate from falling off and damaging another component.

In a possible implementation, the stopper includes a second body portion, a connection portion, and a second bent portion:
  the connection portion is separately connected to the second body portion and the second bent portion;
  the second body portion is connected to the bottom plate; and
  the second bent portion shields a part of the connection plate, and is configured to limit the displacement of the connection plate in the third direction.

In the foregoing solution, the connection portion not only can connect the second body portion and the second bent portion, but also can raise the entire stopper, so that the stopper adapts to a location of the connection plate.

In a possible implementation, the bearing assembly further includes a reset component, and the reset component is configured to apply force to the lens carrier to reset the lens carrier.

A second aspect of this application provides a camera module, including a lens and the image stabilization motor according to any one of the foregoing implementations, where the lens is mounted on the lens carrier.

In a possible implementation, the camera module further includes a first sensing component, a second sensing component, and a control unit:
  the first sensing component is configured to sense a rotation angle of the lens carrier;
  the second sensing component is configured to feed back the rotation angle measured by the first sensing component; and
  the control unit is configured to control driving force of the driving component based on the rotation angle of the first sensing component sensed by the second sensing component, to control a rotation angle of the lens carrier in the plane in which the first direction and the second direction are located.

The second sensing component is disposed to feed back the rotation angle measured by the first sensing component, and the control unit controls, based on the rotation angle sensed by the second sensing component, the rotation angle of the lens carrier in the plane in which the first direction and the second direction are located, to precisely adjust the rotation angle of the lens carrier.

In a possible implementation, the camera module further includes a third sensing component and a fourth sensing component:
  the third sensing component is configured to sense a rotation angle of the lens carrier;
  the fourth sensing component is configured to feed back the rotation angle measured by the third sensing component; and
  the control unit is configured to control driving force of the driving component based on the rotation angle of the third sensing component sensed by the fourth sensing component, to control a rotation angle of the lens carrier in the plane in which the first direction and the third direction are located.

The fourth sensing component is disposed to feed back the rotation angle measured by the third sensing component, and the control unit controls, based on the rotation angle sensed by the fourth sensing component, the rotation angle of the lens carrier in the plane in which the first direction and the third direction are located, to precisely adjust the rotation angle of the lens carrier.

In a possible implementation, both the first sensing component and the third sensing component are magnets:
both the second sensing component and the fourth sensing component are Hall elements; and
the driving component is a coil.

A third aspect of this application provides an electronic device, including the camera module according to any one of the foregoing implementations.

In a possible implementation, the electronic device further includes a gyroscope and a processing unit:
the gyroscope is connected to the processing unit;
the processing unit is connected to the control unit;
the gyroscope is configured to collect angular velocity information of the lens in the camera module, and send the angular velocity information to the processing unit;
the processing unit is configured to calculate shake compensation information of the lens based on the angular velocity information, and send the shake compensation information to the control unit in the camera module; and
the control unit is configured to control a drive current of the driving component based on the shake compensation information, so that the lens carrier rotates in a preset angle range relative to the base.

The gyroscope, the processing unit, and the control unit are disposed to form closed-loop control, so as to precisely adjust a rotation angle of the lens carrier.

The technical solutions provided in this application may achieve the following beneficial effects:

In the image stabilization motor, the camera module, and the electronic device, by disposing the bearing assembly, the lens carrier needs to overcome only the friction force between the lens carrier and the bearing assembly in an entire rotation process. In this way, the lens carrier can drive the lens to rotate in the large angle range, and the camera module can adapt to more scenarios.

It should be understood that the foregoing general description and the following detailed description are merely examples, and cannot limit this application.

BRIEF DESCRIPTION OF DRAWINGS

To describe technical solutions in the specific implementations of this application more clearly, the following briefly describes accompanying drawings for describing the specific implementations or the conventional technology. It is clear that the accompanying drawings in the following descriptions show some implementations of this application, and a person of ordinary skill in the art may further derive other accompanying drawings from these accompanying drawings without creative efforts.

REFERENCE NUMERALS

Figure 1:
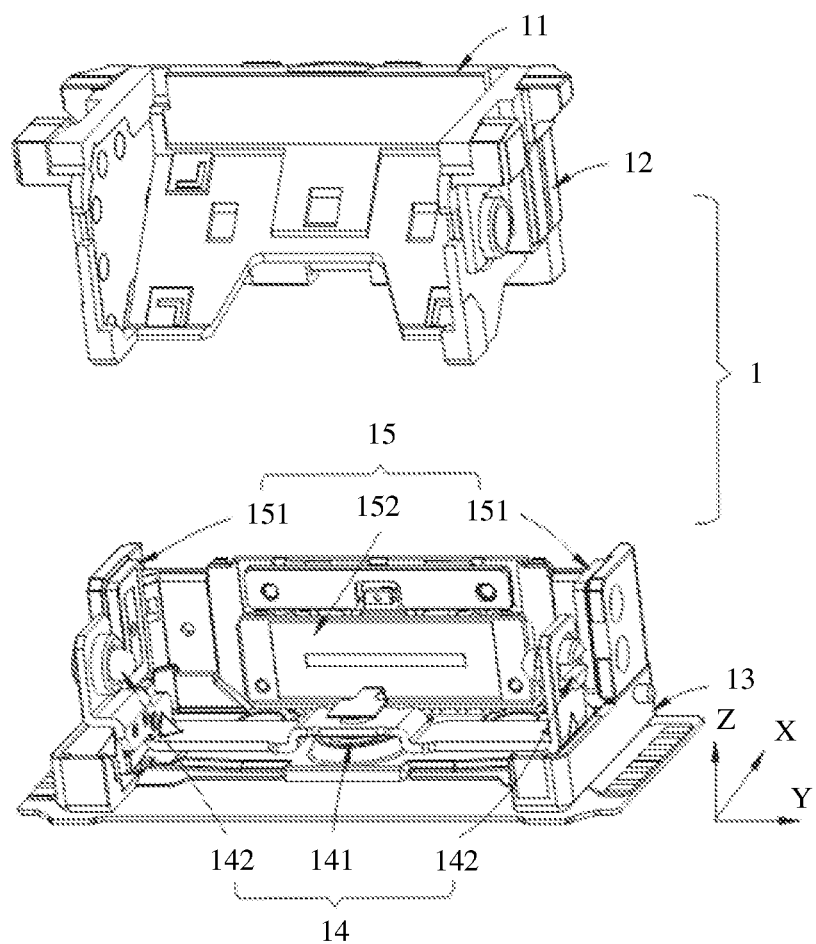
FIG. 1 is a schematic exploded diagram of a structure of an image stabilization motor according to an embodiment of this application.

100—camera module;
1—image stabilization motor;
11—lens carrier;
111—first side panel;
111a—dent;
112—third side panel;
12—sensing component;
121—first sensing piece;
122—second sensing piece;
13—base;
131—bottom plate;
132—second side panel;
133—fourth side panel;
14—bearing assembly;
141—first bearing assembly;
141a—bearing;
141b—rotating shaft;
141c—first reset spring;
142—second bearing assembly;
142a—mounting base;
142b—ball;
142c—second reset spring;
15—driving component;
151—first driving piece;
152—second driving piece;
16—connection plate;
161—first body portion;
162—first bent portion;
17—stopper;
171—second body portion;
172—connection portion;
173—second bent portion;
2—lens;
3—first sensing component;
4—second sensing component;

5—third sensing component;
6—fourth sensing component;
7—control unit;
200—gyroscope; and
300—processing unit.

DESCRIPTION OF EMBODIMENTS

The following clearly describes technical solutions of this application with reference to accompanying drawings. It is clear that the described embodiments are some but not all of embodiments of this application. All other embodiments obtained by a person of ordinary skill in the art based on embodiments of this application without creative efforts shall fall within the protection scope of this application.

Terms used in embodiments of this application are merely for the purpose of describing specific embodiments, but are not intended to limit this application. The terms "a", "said" and "the" of singular forms used in embodiments and the appended claims of this application are also intended to include plural forms, unless otherwise specified in the context clearly.

It should be understood that the term "and/or" in this specification describes only an association relationship for describing associated objects and represents that any one of three relationships may exist. For example, A and/or B may represent any one of the three cases: Only A exists, both A and B exist, or only B exists. In addition, the character "/" in this specification generally indicates an "or" relationship between the associated objects.

It should be noted that orientation words such as "above", "below", "left", and "right" described in embodiments of this application are described from perspectives shown in the accompanying drawings, and should not be construed as a limitation on embodiments of this application. Moreover, in the context, it also should be understood that, when it is mentioned that one element is connected "above" or "below" another element, the element can be directly connected "above" or "below" the another element, or may be indirectly connected "above" or "below" the another element through an intermediate element.

An electronic device generally includes a camera module, configured to perform photographing or video recording. The electronic device may be a mobile phone, a tablet computer, or another camera device.

The camera module includes a motor and a lens. The motor includes a lens carrier, and the lens is mounted on the lens carrier. A driving component of the motor drives the lens carrier to move the lens. To prevent the camera module from shaking in a working process, the motor is usually an image stabilization motor. In an existing camera module, a lens is mounted on an image stabilization motor by using a spring plate. Limited by rigidity of the spring plate, the existing camera module cannot achieve a relatively good image stabilization effect in many scenarios. Embodiments of this application provide an image stabilization motor, a camera module, and an electronic device, to resolve the foregoing technical problem.

FIG. 1 is a schematic exploded diagram of a structure of an image stabilization motor according to an embodiment of this application. As shown in FIG. 1, an embodiment of this application provides an image stabilization motor 1, including a lens carrier 11, a sensing component 12, a base 13, a bearing assembly 14, and a driving component 15.

The lens carrier 11 is configured to mount a lens. The sensing component 12 is fastened to the lens carrier 11, the bearing assembly 14 is mounted to the base 13, and the driving component 15 is fastened to the base 13.

The driving component 15 cooperates with the sensing component 12, so that the lens carrier 11 can rotate around the bearing assembly 14.

The bearing assembly 14 may include a first bearing assembly 141 and second bearing assemblies 142. When the lens carrier 11 rotates around the first bearing assembly 141, the lens carrier 11 may rotate in a plane in which a first direction (X) and a second direction (Y) are located, thereby implementing image stabilization of the lens carrier 11 in the plane in which the first direction (X) and the second direction (Y) are located.

In this embodiment, the first direction (X) is a width direction of the image stabilization motor 1, and the second direction (Y) is a length direction of the image stabilization motor 1. In another embodiment, the first direction (X) and the second direction (Y) may alternatively be other directions based on a shape of the image stabilization motor 1.

When the lens carrier 11 rotates around the second bearing assemblies 142, the lens carrier 11 may rotate in a plane in which the first direction (X) and a third direction (Z) are located, thereby implementing image stabilization of the lens carrier 11 in the plane in which the first direction (X) and the third direction (Z) are located.

In this embodiment, the third direction (Z) is a height direction of the image stabilization motor 1. In another embodiment, the third direction (Z) may alternatively be another direction based on the shape of the image stabilization motor 1.

In the image stabilization motor 1 provided in this embodiment, the bearing assembly 14 is disposed, so that the lens carrier 11 needs to overcome only friction force between the lens carrier 11 and the bearing assembly 14 in an entire rotation process. In this way, the lens carrier 11 can drive the lens to rotate in a large angle range, and a camera module can adapt to more scenarios.

Figure 2:
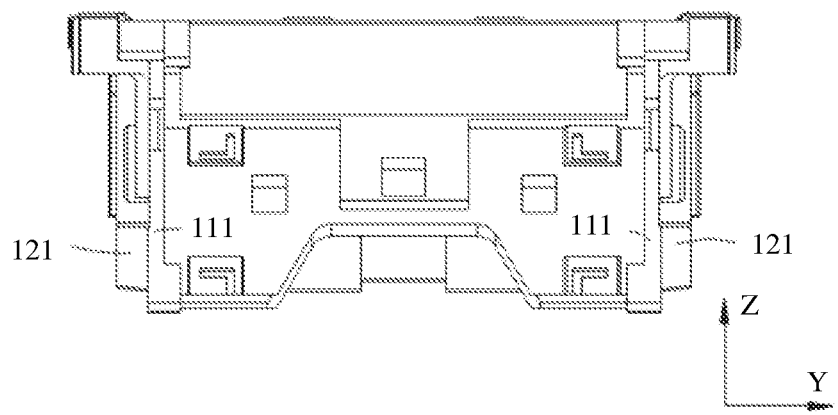
FIG. 2 is a front view of a structure of a lens carrier in an image stabilization motor according to an embodiment of this application.

FIG. 2 is a front view of a structure of the lens carrier in the image stabilization motor according to an embodiment of this application. As shown in FIG. 2, in a specific implementation, the sensing component 12 may include a pair of first sensing pieces 121 arranged in the second direction (Y), and the pair of first sensing pieces 121 may be magnets.

Figure 3:
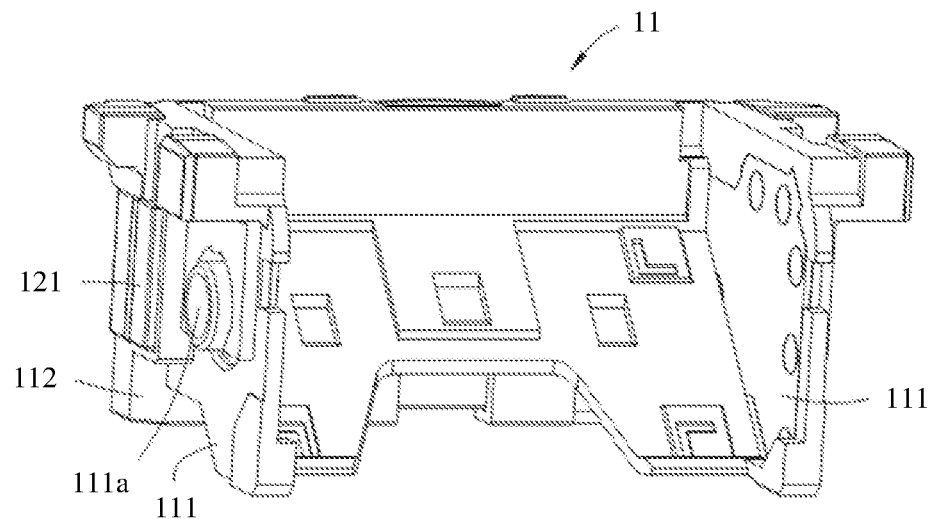
FIG. 3 is a structural diagram of a lens carrier in an image stabilization motor at an angle according to an embodiment of this application.

The pair of first sensing pieces 121 may be symmetrically fastened on two sides of the lens carrier 11. FIG. 3 is a structural diagram of the lens carrier in the image stabilization motor at an angle according to an embodiment of this application. As shown in FIG. 3, one first sensing piece 121 is fastened on one side of the lens carrier 11.

Figure 4:
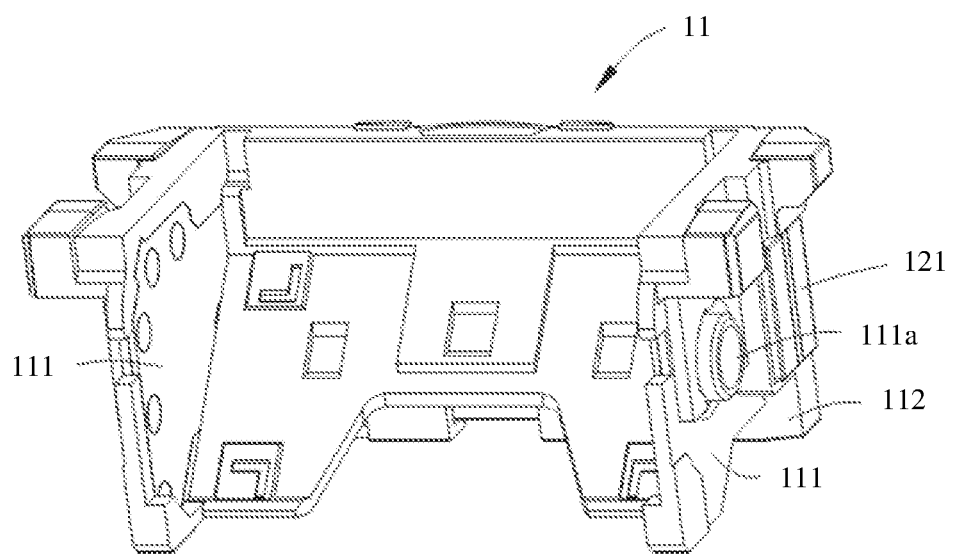
FIG. 4 is a structural diagram of a lens carrier in an image stabilization motor at another angle according to an embodiment of this application.

FIG. 4 is a structural diagram of the lens carrier in the image stabilization motor at another angle according to an embodiment of this application. As shown in FIG. 4, the other first sensing piece 121 is fastened to the other side of the lens carrier 11.

As shown in FIG. 1, the driving component 15 includes a pair of first driving pieces 151 arranged in the second direction (Y), and the bearing assembly 14 includes the first bearing assembly 141.

The first driving pieces 151 cooperate with the pair of first sensing pieces 121, so that the lens carrier 11 rotates around the first bearing assembly 141, thereby driving the lens carrier 11 to rotate in a plane in which the first direction (X) and the second direction (Y) are located.

The pair of first sensing pieces 121 may be magnets, and the first driving pieces 151 may be coils. The first sensing piece 121 senses a change of a current in the first driving piece 151 to generate driving force, so as to drive the lens carrier 11 to rotate.

In a specific implementation, refer to FIG. 2 to FIG. 4. The lens carrier 11 may include a pair of first side panels 111 arranged in the second direction (Y) and disposed opposite to each other, and the pair of first sensing pieces 121 are separately fastened to the first side panel 111. The pair of first sensing pieces 121 may be magnets, and may be respectively fastened to the first side panel 111 through adhesive bonding.

Figure 5:
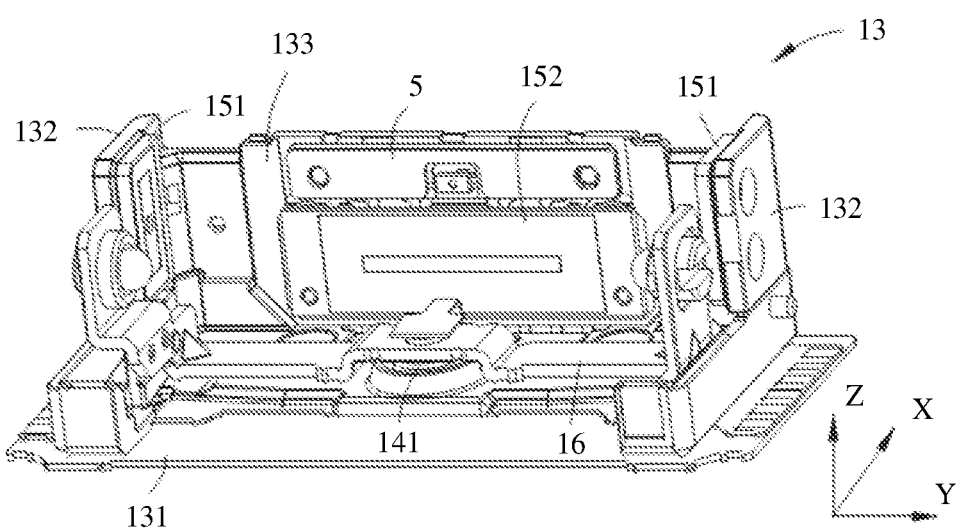
FIG. 5 is a structural diagram of a base in an image stabilization motor at an angle according to an embodiment of this application.

FIG. 5 is a structural diagram of the base in the image stabilization motor at an angle according to an embodiment of this application. As shown in FIG. 5, the base 13 may include a bottom plate 131 and a pair of second side panels 132 arranged in the second direction (Y) and disposed opposite to each other. The second side panels 132 may be connected to the bottom plate 131, and the second side panels 132 and the bottom plate 131 may alternatively be integrally formed. The pair of first driving pieces 151 may be respectively fastened on the pair of second side panels 132.

The bearing assembly 14 includes the first bearing assembly 141, and the first bearing assembly 141 is mounted on the bottom plate 131.

Figure 6:
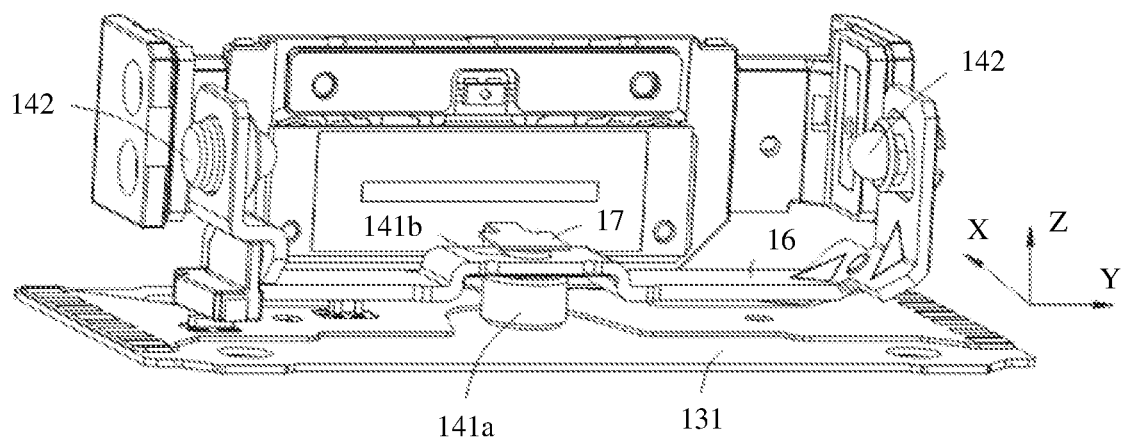
FIG. 6 is a structural diagram of a base in an image stabilization motor at another angle according to an embodiment of this application.

FIG. 6 is a structural diagram of the base in the image stabilization motor at another angle according to an embodiment of this application. As shown in FIG. 6, in a specific implementation, the first bearing assembly 141 includes a bearing 141a and a rotating shaft 141b. The bearing 141a is mounted on the bottom plate 131, and the rotating shaft 141b is mounted on an inner hole of the bearing 141a.

The first driving pieces 151 cooperate with the first sensing pieces 121, so that the lens carrier 11 rotates around the rotating shaft 141b, thereby driving the lens carrier 11 to rotate in the plane in which the first direction (X) and the second direction (Y) are located.

Specifically, the image stabilization motor 1 in this embodiment may further include a connection plate 16. The connection plate 16 is fixedly connected to the rotating shaft 141b, and the second bearing assemblies 142 are mounted on the connection plate 16. When the connection plate 16 and the rotating shaft 141b jointly rotate in the plane in which the first direction (X) and the second direction (Y) are located, the connection plate 16 can drive the second bearing assemblies 142 to also rotate in the plane. The lens carrier 11 may be mounted on the second bearing assemblies 142, so that the lens carrier 11 rotates in the plane in which the first direction (X) and the second direction (Y) are located, thereby implementing the image stabilization effect.

Figure 7:
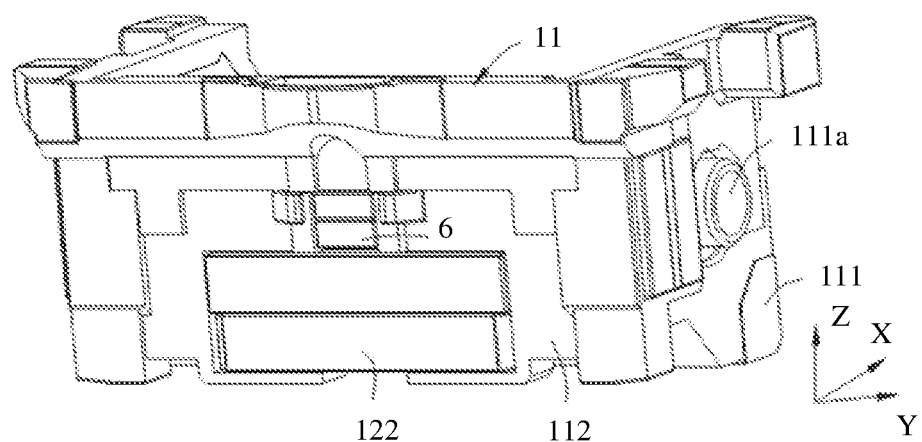
FIG. 7 is a structural diagram of a lens carrier in an image stabilization motor at still another angle according to an embodiment of this application.

FIG. 7 is a structural diagram of the lens carrier in the image stabilization motor at still another angle according to an embodiment of this application. FIG. 7 is a rear view of the lens carrier 11. In a specific implementation, the sensing component 12 includes a second sensing piece 122, and the second sensing piece 122 may be a magnet. As shown in FIG. 5, the second driving piece 152 may be a coil. The second sensing piece 122 senses a change of a current in the second driving piece 152 to generate driving force, so as to drive the lens carrier 11 to rotate.

As shown in FIG. 5, the driving component 15 includes the second driving piece 152, and the second driving piece 152 corresponds to a location of the second sensing piece 122.

As shown in FIG. 6, the bearing assembly 14 includes a pair of second bearing assemblies 142.

The second driving piece 152 cooperates with the second sensing piece 122, so that the lens carrier 11 rotates around the second bearing assemblies 142, thereby driving the lens carrier 11 to rotate in a plane in which the first direction (X) and the third direction (Z) are located.

In a specific implementation, as shown in FIG. 7, the lens carrier 11 includes a third side panel 112, and two sides of the third side panel 112 may be respectively connected to the first side panels 111. The third side panel 112 and the first side panels 111 may alternatively be integrally formed, and the second sensing piece 122 is fastened to the third side panel 112.

As shown in FIG. 5, the base 13 includes the bottom plate 131 and a fourth side panel 133. The fourth side panel 133 is connected to the bottom plate 131 or the fourth side panel 133 and the bottom plate 131 are integrally formed. The second driving piece 152 is fastened on the fourth side panel 133, and the fourth side panel 133 corresponds to the third side panel 112, so that the second driving piece 152 can cooperate with the second sensing piece 122 on the third side panel 112 to perform sensing.

As described above, the image stabilization motor 1 may include the connection plate 16, and the bearing assembly 14 includes the first bearing assembly 141 and the second bearing assemblies 142. The first bearing assembly 141 is mounted on the base 13, the connection plate 16 is connected to the first bearing assembly 141, the second bearing assemblies 142 are mounted on the connection plate 16, and the lens carrier 11 cooperates with the second bearing assemblies 142. In this way, rotation cooperation between the lens carrier 11 and each of the first bearing assembly 141 and the second bearing assemblies 142 can be implemented.

Figure 8:
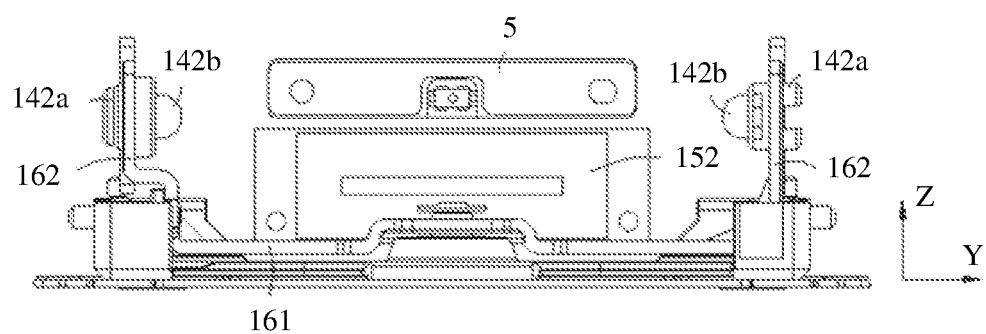
FIG. 8 is a schematic diagram of a structure of a base in an image stabilization motor in which some components are omitted according to an embodiment of this application.

FIG. 8 is a schematic diagram of a structure in which some components are omitted in the base in the image stabilization motor according to an embodiment of this application. As shown in FIG. 8, in a specific implementation, the connection plate 16 includes a first body portion 161 and a first bent portion 162.

Figure 9:
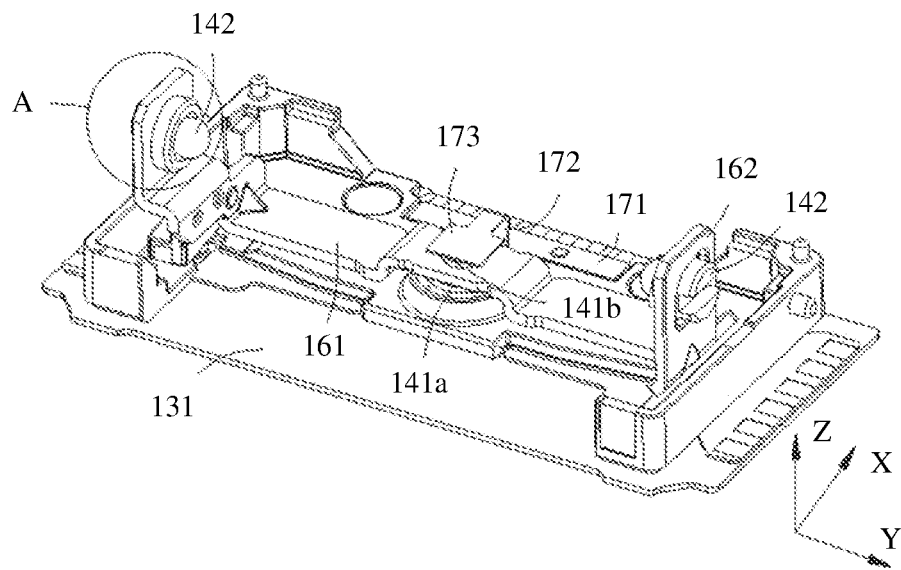
FIG. 9 is a three-dimensional diagram of a structure of a base in an image stabilization motor in which some components are omitted according to an embodiment of this application.

FIG. 9 is a three-dimensional diagram of a structure of the base in the image stabilization motor in which some components are omitted according to an embodiment of this application. As shown in both FIG. 8 and FIG. 9, the first bent portion 162 is connected to two ends of the first body portion 161, and the first bent portion 162 and the first body portion 161 may alternatively be integrally formed. The first bearing assembly 141 is mounted on the first body portion 161, and the second bearing assemblies 142 are mounted on the first bent portion 162.

The first body portion 161 can rotate around the rotating shaft 141b in the first bearing assembly 141, and the lens carrier 11 is mounted on the first bent portion 162 by using the second bearing assemblies 142. Therefore, the lens carrier 11 can rotate around the first bearing assembly 141 along with the first body portion 161, to implement image stabilization in the plane in which the first direction (X) and the second direction (Y) are located.

The lens carrier 11 can rotate around the second bearing assemblies 142 to implement image stabilization in the plane in which the first direction (X) and the third direction (Z) are located.

Figure 10:
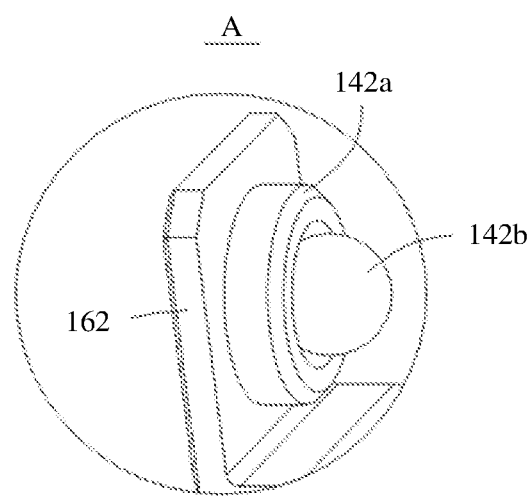
FIG. 10 is an enlarged view of the encircled portion labeled as A in FIG. 9.

FIG. 10 is an enlarged view of the encircled portion labeled as A in FIG. 9. As shown in FIG. 10, in a specific implementation, the second bearing assembly 142 includes a mounting base 142a and a ball 142b, where the ball 142b is mounted on the mounting base 142a, the first bent portion 162 is provided with a mounting hole, and the mounting base 142a is mounted in the mounting hole. Specifically, the mounting hole may have inner threads, and the mounting base 142a may have outer threads, so that the mounting base 142a is connected to the mounting hole in a threaded connection manner.

The ball 142b cooperates with the lens carrier 11, so that the lens carrier 11 can implement fine adjustment in all directions.

As shown in FIG. 4 and FIG. 7, in a specific implementation, the lens carrier 11 may be provided with a dent 111a, and the ball 142b cooperates with the dent 111a, so that rotation cooperation between the lens carrier 11 and the second bearing assemblies 142 can be implemented. Certainly, the lens carrier 11 may alternatively be of another structure, for example, another structure such as a through hole or a groove, and cooperate with the ball 142b. This is not limited herein. As shown in FIG. 9, the base 13 may include the bottom plate 131, and the first body portion 161 is connected to the bottom plate 131. Specifically, the first body portion 161 may be welded to and fastened to the rotating shaft 141b of the first bearing assembly 141, so that the first body portion 161 can rotate in the plane in which the first direction (X) and the second direction (Y) are located, thereby implementing image stabilization.

As shown in FIG. 6, in a specific implementation, the image stabilization motor 1 may further include a stopper 17. The stopper 17 is mounted on the bottom plate 131, and is configured to limit displacement of the connection plate 16 in the third direction (Z). In other words, the stopper 17 can limit the connection plate 16.

In a process of using an electronic device, an angle of the image stabilization motor 1 often changes. The angle in FIG. 6 is used as an example. When the electronic device adapts to different photographing angles, the base 13 in FIG. 6 may be upside down. In this case, the stopper 17 is located below the connection plate 16. The connection plate 16 may be detached from the rotating shaft 141b due to gravity and bearing a weight of another component. In this case, the stopper 17 can resist the connection plate 16 and prevent the connection plate 16 from falling off and damaging another component.

As shown in FIG. 9, the stopper 17 may include a second body portion 171, a connection portion 172, and a second bent portion 173. The connection portion 172 is separately connected to the second body portion 171 and the second bent portion 173, and the three may alternatively be integrally formed. The second body portion 171 is connected to the bottom plate 131, and the second bent portion 173 shields a part of the connection plate 16, and is configured to limit the displacement of the connection plate 16 in the third direction Z.

The stopper 17 may be integrally bent and formed, and the second body portion 171 may be bonded to the bottom plate 131 by using adhesive. The connection portion 172 not only can connect the second body portion 171 and the second bent portion 173, but also can raise the entire stopper 17, so that the connection portion 172 adapts to a location of the connection plate 16.

An embodiment of this application further provides a camera module, including a lens and the image stabilization motor 1 provided in any embodiment of this application. The lens is mounted on the lens carrier 11 of the image stabilization motor 1.

Figure 11:
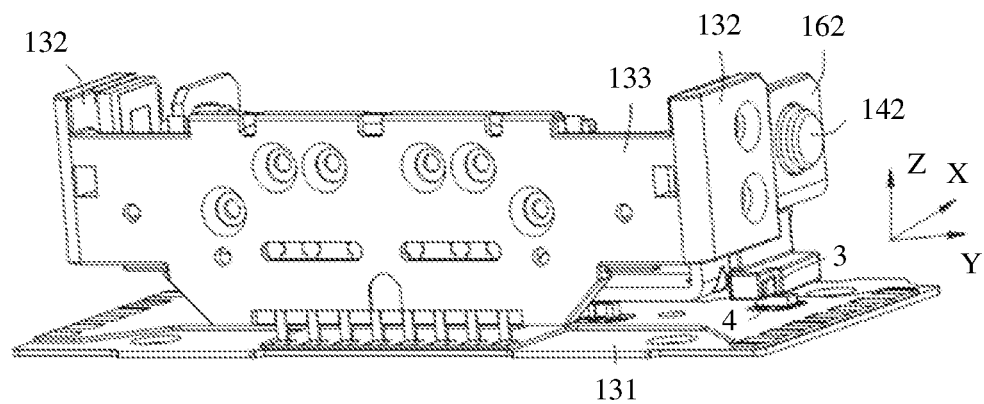
FIG. 11 is a state diagram obtained after a base in an image stabilization motor cooperates with a connection plate according to an embodiment of this application.

FIG. 11 is a state diagram obtained after the base in the image stabilization motor fits the connection plate according to an embodiment of this application. In a specific implementation, the camera module further includes a first sensing component 3 and a second sensing component 4. The first sensing component 3 may be fastened on the connection plate 16. Certainly, the first sensing component 3 may alternatively be disposed at another location, as long as a rotation angle of the lens carrier 11 can be sensed. Specifically, the first sensing component 3 may be a magnet, and the second sensing component 4 may be a Hall element. The second sensing component 4 may be fastened on the bottom plate 131 of the base 13, and is configured to feed back a rotation angle measured by the first sensing component 3. Certainly, the second sensing component 4 may alternatively be disposed at another location.

Figure 13:
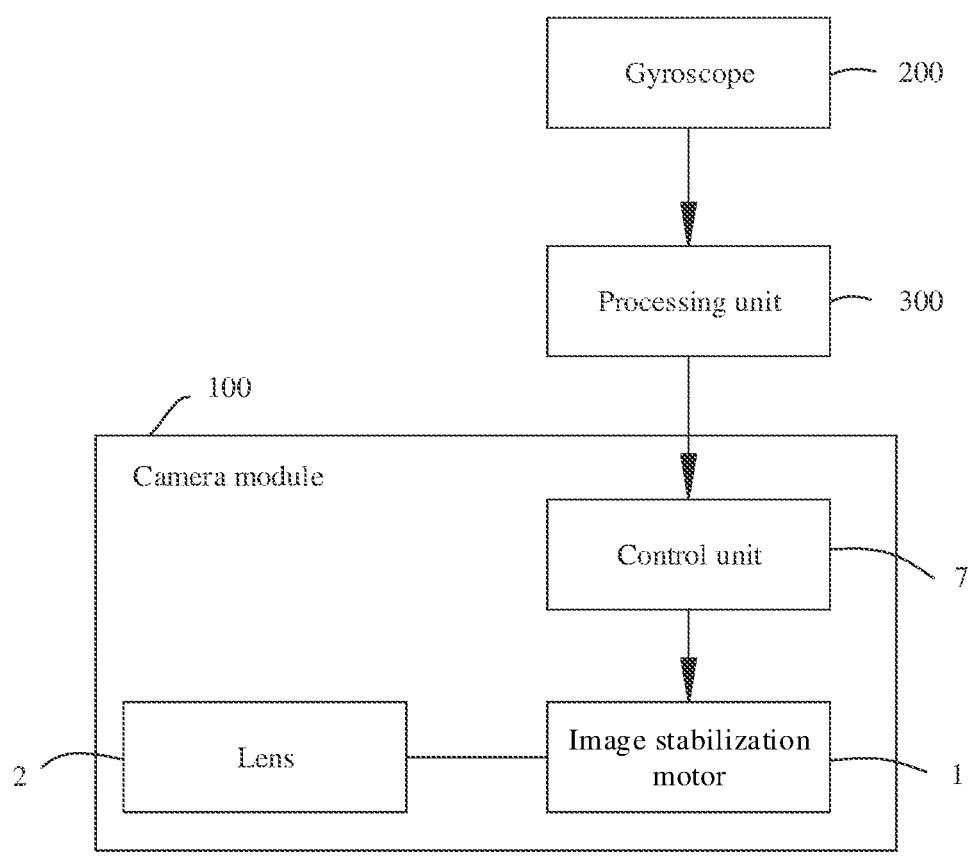
FIG. 13 is a block diagram of a structure of an electronic device according to an embodiment of this application.

As shown in FIG. 13, the camera module may further include a control unit 7. The control unit 7 is configured to control driving force of the driving component 15 based on the rotation angle of the first sensing component 3 sensed by the second sensing component 4, to control a rotation angle of the lens carrier 11 in the plane in which the first direction (X) and the second direction (Y) are located. In this embodiment, the driving component 15 is a coil. A current passing through the coil is controlled, so that magnetic field Lorentz force can be controlled.

In this embodiment, an image stabilization angle of the camera module can reach more than 4°. In addition, as the stabilization angle increases, friction resistance of the bearing assembly 14 does not increase, so that large-angle stabilization can be implemented when retention force is limited.

As shown in FIG. 5 and FIG. 7, in a specific implementation, the camera module may further include a third sensing component 5 and a fourth sensing component 6. The third sensing component 5 is configured to sense a rotation angle of the lens carrier 11, and the fourth sensing component 6 is configured to feed back the rotation angle measured by the third sensing component 5.

The third sensing component 5 may be a magnet, and may be fastened on the fourth side panel 133 of the base 13, as shown in FIG. 5. Certainly, the third sensing component 5 may alternatively be disposed at another location.

The fourth sensing component 6 may be a Hall element, and may be fastened on the back of the third side panel 112 of the lens carrier 11. After the lens carrier 11 is assembled with the base 13, the fourth side panel 133 corresponds to the third side panel 112, and the fourth sensing component 6 can sense the third sensing component 5.

The control unit 7 is configured to control driving force of the driving component 15 based on the rotation angle of the third sensing component 5 sensed by the fourth sensing component 6, to control a rotation angle of the lens carrier 11 in the plane in which the first direction (X) and the third direction (Z) are located. The driving component 15 may be a coil.

Figure 12:
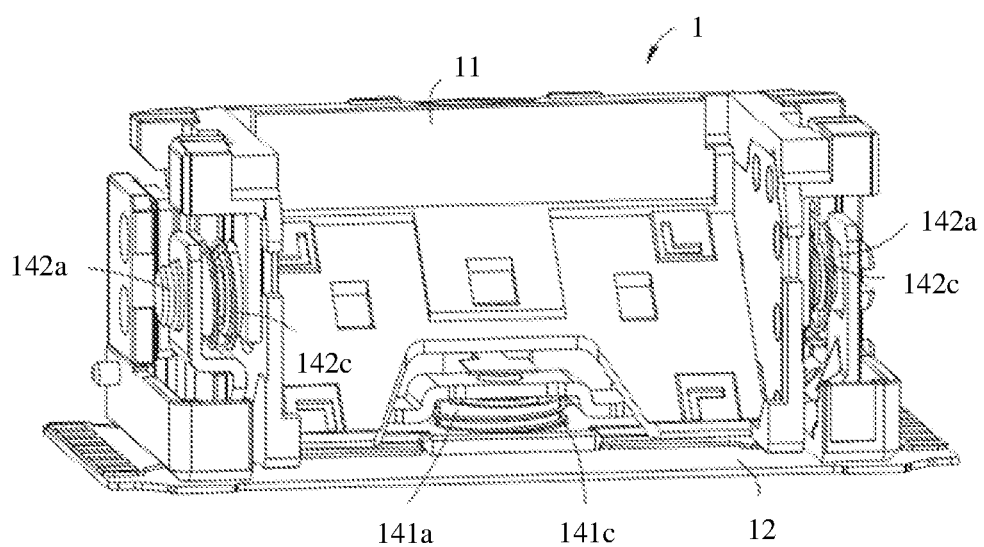
FIG. 12 is a schematic diagram of a structure of an image stabilization motor according to still another embodiment of this application.

FIG. 12 is a schematic diagram of a structure of an image stabilization motor according to still another embodiment of this application. As shown in FIG. 12, in a specific implementation, the bearing assembly 14 further includes a reset component. Specifically, the first bearing assembly 141 may further include a first reset spring 141c, and the first reset spring 141c is sleeved over the bearing 141a, to reset the lens carrier 11 after rotation.

The second bearing assembly 142 may further include a second reset spring 142c, and the second reset spring 142c is sleeved on the mounting base 142a, to reset the lens carrier 11 after rotation.

An embodiment of this application further provides an electronic device, including the camera module provided in any embodiment of this application.

FIG. 13 is a block diagram of a structure of an electronic device according to an embodiment of this application. The electronic device includes a camera module 100 provided in any embodiment of this application. The electronic device further includes a gyroscope 200 and a processing unit 300.

The gyroscope 200 is connected to the processing unit 300, and the processing unit 300 is connected to the control unit 7.

The gyroscope 200 is configured to collect angular velocity information of a lens 2 in the camera module 100, and send the angular velocity information to the processing unit 300. The processing unit 300 is configured to calculate shake compensation information of the lens 2 based on the angular velocity information, and send the shake compensation information to the control unit 7 in the camera module 100. The control unit 7 is configured to control a drive current of the driving component 15 in the image stabilization motor 1 based on the shake compensation information, so that the lens carrier 11 rotates in a preset angle range relative to the base 13, to implement image stabilization of the lens 2.

As described above, by using the Hall effect, the second sensing component 4 can feed back a real-time location change of the first sensing component 3 by sensing a change of a magnetic field. The fourth sensing component 6 can feed back a real-time location change of the third sensing component 5 by sensing the change of the magnetic field. When the electronic device shakes in a use process, the gyroscope 200 can detect a shake direction and a shake magnitude of the electronic device, and decompose, through signal processing, a signal to obtain a target location at which the lens carrier 11 needs to be stabilized.

In this case, initial locations of the first sensing component 3 and the third sensing component 5 (which are specifically magnets) detected by the second sensing component 4 and the fourth sensing component 6 (which are specifically Hall elements) are used. The control unit 7 determines, based on the initial locations and the target location, a difference between a real-time location of the lens carrier 11 and the target location according to a control algorithm, and adjusts a magnitude and a direction of a current of the driving component 15 (which may be specifically a coil), to implement rotation of the lens carrier 11 in different directions and at different angles.

The real-time location of the lens carrier 11 is always compared with the target location. If the real-time location is inconsistent with the target location, the magnitude and the direction of the current of the driving component 15 are continuously adjusted according to the control algorithm. If the real-time location is consistent with the target location, the camera module 100 may perform a next action, thereby implementing closed-loop control of image stabilization and improving precision of image stabilization.

The foregoing descriptions are merely embodiments of this application, and are not intended to limit this application. For a person skilled in the art, this application may have various modifications and variations. Any modification, equivalent replacement, or improvement made without departing from the principle of this application shall fall within the protection scope of this application.

What is claimed is:

1. An image stabilization motor, comprising:
a lens carrier, configured to mount a lens;
a sensing component, fastened on the lens carrier;
a base;
a bearing assembly mounted on the base; and
a driving component, fastened on the base, wherein the driving component cooperates with the sensing component, so that the lens carrier can rotate around the bearing assembly,
wherein the bearing assembly comprises a first bearing assembly and a pair of second bearing assemblies, and the first bearing assembly is mounted on the base;
the image stabilization motor further comprises a connection plate, and the first bearing assembly is mounted on the connection plate,
the second bearing assemblies are mounted on the connection plate; and
the lens carrier cooperates will second bear g assemblies,
wherein the connection plate comprises a first body portion and a first bent portion;
the first bent portion is connected to two ends of the first body portion;
the first bearing assembly is mounted on the first body portion; and
the second bearing assemblies are mounted on the first bent portion,
wherein a second bearing assembly comprises a mounting base and a ball, and the ball is mounted on the mounting base;
the first bent portion is provided with a mounting hole;
the mounting base is mounted in the mounting hole; and
the ball cooperates with the lens carrier.

2. The image stabilization motor according to claim 1, wherein the sensing component comprises a pair of first sensing pieces arranged in a second direction;
the driving component comprises a pair of first driving pieces arranged in the second direction; and
the first driving pieces cooperate with the first sensing pieces, so that the lens carrier rotates around the first bearing assembly, thereby driving the lens carrier to rotate in a plane in which a first direction and the second direction are located.

3. The image stabilization motor according to claim 2, wherein
the lens carrier comprises a pair of first side panels arranged in the second direction and disposed opposite to each other; and
the pair of first sensing pieces are separately fastened on the pair of first side panels.

4. The image stabilization motor according to claim 3, wherein
the base comprises a bottom plate and a pair of second side panels arranged in the second direction and disposed opposite to each other, wherein the second side panels are connected to the bottom plate;
the pair of first driving pieces are respectively fastened on the pair of second side panels; and
the first bearing assembly is mounted on the bottom plate.

5. The image stabilization motor according to claim 4, wherein the first bearing assembly comprises a bearing and a rotating shaft, and the driving component further comprises a second driving piece;
the bearing is mounted on the bottom plate;
the rotating shaft is mounted in an inner hole of the bearing;
the pair of first driving pieces cooperate with the first sensing pieces, so that the lens carrier rotates around the rotating shaft, thereby driving the lens carrier to rotate in the plane in which the first direction and the second direction are located; and
the second driving piece is fastened on a fourth side panel.

6. A camera module, comprising a lens and an image stabilization motor, wherein the image stabilization motor comprises:
a lens carrier, configured to mount a lens;
a sensing component, fastened on the lens carrier;
a base;
a bearing assembly mounted on the base;
a driving component, fastened on the base, wherein
the driving component cooperates with the sensing component, so that the lens carrier can rotate around the bearing assembly; and
the lens is mounted on the lens carrier,
wherein the bearing assembly comprises a first bearing assembly and a pair of second bearing assemblies, and the first bearing assembly is mounted on the base;
the image stabilization motor further comprises a connection plate, and the first bearing assembly is mounted on the connection plate;
the second bearing assemblies are mounted on the connection plate; and
the lens carrier e second bearing assemblies,
wherein the connection plate comprises a first body portion and a first bent portion,
the first bent portion is connected to two ends of the first body portion;
the first bearing assembly is mounted on the first body portion; and
the second bear assemblies are mounted on the first bent portion,
wherein a second bearing assembly comprises a mounting base and a ball, and the ball is mounted on the mounting base;
the first bent portion is provided with a mounting hole,
the mounting base is mounted in the mounting hole, and
the ball cooperates with the lens carrier.

7. The camera module according to claim 6, wherein the sensing component comprises a second sensing piece;
the driving component comprises a second driving piece; and
the second driving piece cooperates with the second sensing piece, so that the lens carrier rotates around the second bearing assemblies, thereby driving the lens carrier to rotate in a plane in which a first direction and a third direction are located.

8. The camera module according to claim 7, wherein
the lens carrier comprises a third side panel, and the second sensing piece is fastened on the third side panel; and
the base comprises a bottom plate and a fourth side panel, and the fourth side panel is connected to the bottom plate and corresponds to the third side panel.

9. The camera module according to claim 6, wherein the lens carrier is provided with a dent; and
the ball cooperates with the dent.

10. The camera module according to claim 6, wherein the base comprises a bottom plate; and
the first body portion is connected to the bottom plate.

11. The camera module according to claim 10, wherein the image stabilization motor further comprises a stopper; and
the stopper is connected to the bottom plate, and is configured to limit displacement of the connection plate in a third direction.

12. The camera module according to claim 11, wherein the stopper comprises a second body portion, a connection portion, and a second bent portion;
the connection portion is separately connected to the second body portion and the second bent portion;
the second body portion is connected to the bottom plate; and
the second bent portion shields a part of the connection plate, and is configured to limit displacement of the connection plate in the third direction.

13. An electronic device, comprising a camera module including a lens and an image stabilization motor, wherein the image stabilization motor comprises:
a lens carrier, configured to mount a lens;
a sensing component, fastened on the lens carrier;
a base;
a bearing assembly mounted on the base;
a driving component, fastened on the base, wherein
the driving component cooperates with the sensing component, so that the lens carrier can rotate around the bearing assembly; and
the lens is mounted on the lens carrier,
wherein the bearing assembly comprises a first bearing assembly and a pair of second bearing assemblies, and the first bearing assembly is mounted on the base;
the image stabilization motor further comprises a connection plate, and the first bearing assembly is mounted on the connection plate;
the second bearing assemblies are mounted on the connection plate; and
the lens carrier cooperates with the second bearing assemblies,
wherein the connection plate comprises a first body portion and a first bent portion;
the first bent portion is connected to two ends of the first body portion,
the first bearing assembly is mounted on the first body portion; and
the second bearing assemblies are mounted on the first bent portion,
wherein a second bearing assembly comprises a mounting base and a ball, and the ball is mounted on the mounting base,
the first bent portion is provided with a mounting hole;
the mounting base is mounted in the mounting hole; and
the ball cooperates with the lens carrier.

14. The electronic device according to claim 13, wherein the bearing assembly further comprises a reset spring configured to apply force to the lens carrier to reset the lens carrier.

15. The electronic device according to claim 13, wherein the sensing component comprises a pair of first sensing pieces arranged in a second direction;
the driving component comprises a pair of first driving pieces arranged in the second direction; and
the first driving pieces cooperate with the first sensing pieces, so that the lens carrier rotates around the first bearing assembly, thereby driving the lens carrier to rotate in a plane in which a first direction and the second direction are located.

16. The electronic device according to claim 15, wherein
the lens carrier comprises a pair of first side panels arranged in the second direction and disposed opposite to each other; and
the pair of first sensing pieces are separately fastened on the pair of first side panels.

17. The electronic device according to claim 16, wherein
the base comprises a bottom plate and a pair of second side panels arranged in the second direction and disposed opposite to each other, wherein the second side panels are connected to the bottom plate;

the pair of first driving pieces are respectively fastened on the pair of second side panels; and
the first bearing assembly is mounted on the bottom plate.

\* \* \* \* \*

UNITED STATES PATENT AND TRADEMARK OFFICE
CERTIFICATE OF CORRECTION

PATENT NO. : 12,132,990 B2
APPLICATION NO. : 17/941173
DATED : October 29, 2024
INVENTOR(S) : Lei Lu It is certified that error appears in the above-identified patent and that said Letters Patent is hereby corrected as shown below:

In the Claims

Column 14, Claim 1, Line 12, change "will second bear g" to --with the second bearing--;

Column 15, Claim 6, Line 19, change "carrier e second bearing" to --carrier cooperates with the second bearing--; and Column 15, Claim 6, Line 27, change "the second bear" to --the second bearing--.

Signed and Sealed this
Twenty-sixth Day of November, 2024

Katherine Kelly Vidal
*Director of the United States Patent and Trademark Office*